Figure 1:
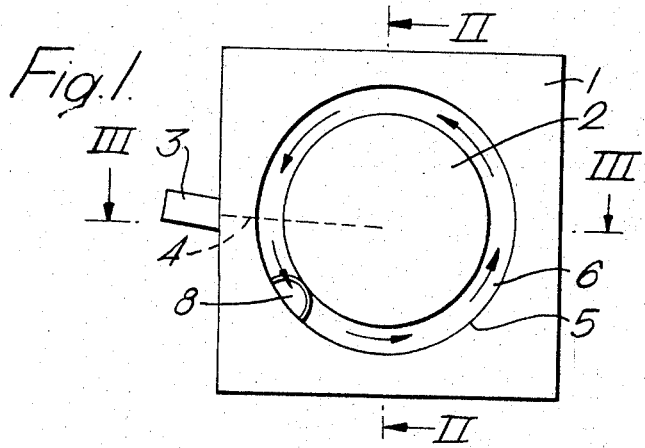

United States Patent [19]
Gran

[11] 3,730,166
[45] May 1, 1973

[54] APPARATUS FOR HEATING WATER BY MEANS OF AN OILBURNER

[76] Inventor: Torleif Gran, Furuset Alle 23, Grorud, Oslo, Norway

[22] Filed: June 16, 1971

[21] Appl. No.: 153,606

[30] Foreign Application Priority Data

June 27, 1970 Norway....................................2531

[52] U.S. Cl................................126/350 R, 431/73
[51] Int. Cl................................................F24h 1/12
[58] Field of Search.....................126/350 R; 431/73; 122/161, 156, 33

[56] References Cited

UNITED STATES PATENTS

| 2,423,000 | 6/1947 | Bennett et al. | 122/161 |
| 48,732 | 7/1965 | Smith | 126/350 R |
| 2,883,948 | 4/1959 | Seidl | 431/173 X |

FOREIGN PATENTS OR APPLICATIONS

| 339,233 | 12/1930 | Great Britain | 126/350 R |
| 339,580 | 7/1921 | Germany | 126/350 R |

*Primary Examiner*—John J. Camby
*Assistant Examiner*—William C. Anderson
*Attorney*—Granville M. Brumbaugh et al.

[57] ABSTRACT

A means is illustrated and described for heating water with an oilburner, particularly for air conditioning units and the like. The combustion chamber is in contact with a water reservoir and is formed as a cylindrical body with the burner nozzle directed substantially in parallel to the end surfaces of the combustion chamber and somewhat oblique with respect to the line of connection from nozzle to cylinder axis. An annular chamber is connected to the end surface of the combustion chamber and the combustion chamber and annular chamber are formed with uniform surfaces.

3 Claims, 4 Drawing Figures

APPARATUS FOR HEATING WATER BY MEANS OF AN OILBURNER

The present invention relates to a means for heating water by an oilburner or the like where the combustion chamber is disposed in contact with a water reservoir.

Many different types of water heating systems are known where the water is heated by means of heat developed in a burner and by the flue-gases produced thereby. Previously the burner has, for example, been disposed in a chamber and the flue-gases conveyed therefrom through a channel system surrounded by the water to be heated. Another embodiment of such a system, which is frequently used, is to convey the water to be heated through pipes or channels which pass through the combustion chamber. One known method is to allow the flue-gases to circulate with tangential introduction of flue-gases along helically-formed water pipes.

Common to all the known water heating systems is that the channels have defined a static flow which leads to heat exchange in an established manner; also common to the previously known means is that, if a different amount of heat is to be supplied to the water, for example, a greater amount of heat in a larger system, it is also necessary to provide larger exchange surfaces, in other words an alteration of the length of the channels.

The disadvantage of the known means is that they entail a rather complex and expensive construction and that the entire heating system must be calculated and constructed to fit each separate heat requirement. It has thus been necessary to construct various sizes of boilers for various sizes of apparatus, possibly to replace or extend the heat exchanging pipe portions. This is particularly disadvantageous in the construction of so-called air conditioning units where the units must be adapted to the particular house wherein they are to be used.

The object of the present invention is to simplify this type of water-heating system and in particular with regard to the boiler member in air conditioning units and the like. The aim of the invention is thus to provide a water heating system which is simple to construct, which is inexpensive to produce and which is still capable of heating the necessary amount of water. The further aim of the invention is to provide a means which is more generally utilizable and which, with a determined exchange surface, can yield different amounts of heat to a water reservoir without any other alteration than the adjustment of the combustion capacity of the oilburner, which hitherto has not been possible.

This is achieved by a means for heating of water with an oilburner or the like where the combustion chamber is disposed in contact with a water reservoir, the said means being characterized in that the combustion chamber is formed as a cylindrical body with burner nozzle directed substantially parallel to the end surfaces of the combustion chamber and somewhat oblique with respect to the line of connection from the nozzle to the axis of the cylinder, that an annular chamber is connected to the end surface of the combustion chamber and that the combustion chamber and annular chamber are formed with uniform surfaces.

A further feature of the invention is that the space between the combustion chamber and the annular chamber is in communication with the water reservoir.

Further, the ring slot is provided, at the end opposed to the combustion chamber, with an outlet for the flue-gas.

The following factors are set forth as basis of the invention. The amount of heat to be transferred is determined in the first place by flue-gas or the amount of gas which is passed along the exchange surfaces. This amount may, in the first place, be determined by the rate of combustion.

By using the technical principles of air flow, it has been found that by passing hot air through a channel of determined shape and dimension, a contact is achieved between hot and cold medium in such a manner that the necessary heat is transferred independent of the surface dimension, when the flow may freely and without hindrance follow the path determined by the velocity. The path of the flue-gas flow changes in accordance with the velocity, provided that approximately equal pressure conditions prevail. This effect has been achieved by forming the combustion chamber according to the invention with uniform walls and in that the flue-gas is conveyed along a helical path from burner to outlet.

When an increased amount of heat or calories is required, the velocity of the flue-gas is increased and the flue-gas thus rotates several times around in the slot and thereby gives off more heat.

It is thus essential that the width of the annular chamber is so adjusted to the velocity that a good surface contact for the gas is obtained.

The inner core of the water reservoir or the combustion chamber may also preferably be filled with water.

With regard to the water reservoir, this may also be formed in a simple manner and, with the uniform open chamber filled with water, good heat convection is achieved in the water, that is to say conveyance of the water away from the exchange surface.

The means is therefore extremely simple and inexpensive to construct, extremely simple to maintain and to adapt to separate requirements. In order to clean the combustion chamber, the end wall, which may be heat insulated, may quite simply be screwed off and a simple and ready access to the combustion chamber is achieved to permit sweeping.

Figure 2:
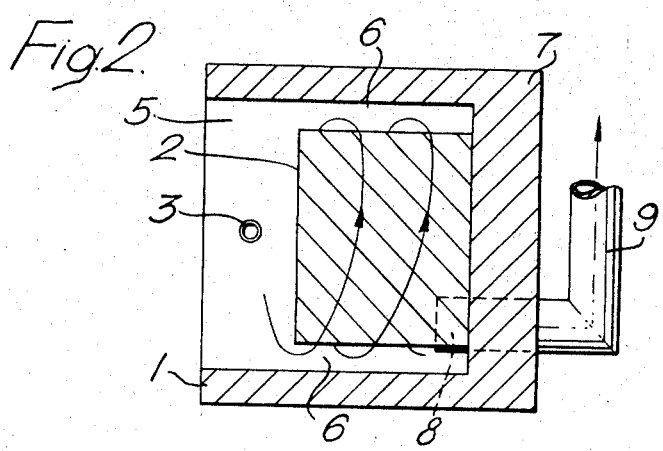
Figure 3:
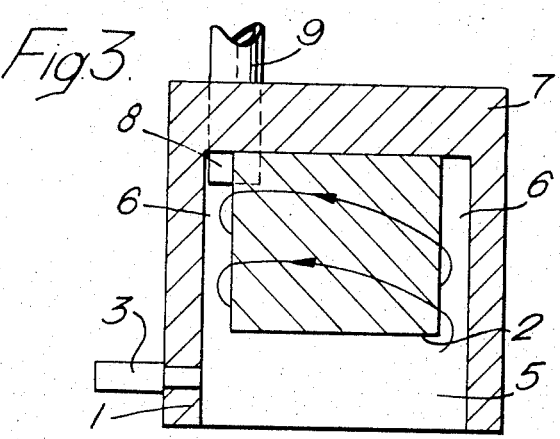

The invention is further explained in the following with reference to a possible embodiment example which is illustrated on the drawing which shows:

FIG. 1 a diagram of the means according to the invention viewed from one side end with the end plate removed, FIG. 2 is a longitudinal section through the means seen from the line II—II on FIG. 1, and FIG. 3 a section through the means seen from the line III—III on FIG. 1.

Figure 4:
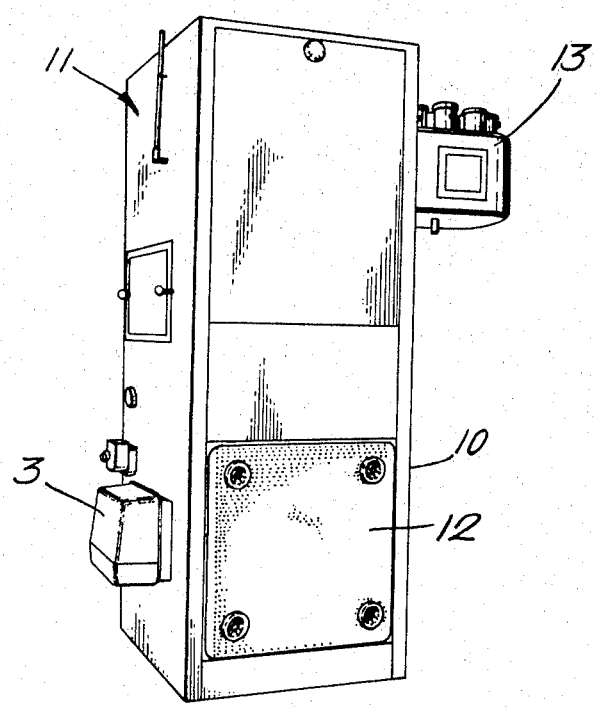

FIG. 4 illustrates an air conditioning unit with a heating means in accordance with the invention.

FIG. 1 shows the water heating means seen from one side thereof with end plate removed, and the water reservoir is located behind the plate portions 1 and possibly 2 as will be clear from FIGS. 2 and 3. The burner with burner-nozzle 3 projects from the side of the means and is directed somewhat obliquely in relation to the line of connection 4 from the nozzle to the axis of the cylinder. The outer combustion chamber into which the burner-nozzle 3 is directed is designated by 5. To this is connected an annular chamber 6 which surrounds an inner open chamber which may also be filled with water and is in open communication with the water reservoir 7 which surrounds the combustion chamber and the annular chamber. These features are most clearly apparent from FIGS. 2 and 3. An outlet opening 8 is arranged in the end of the annular chamber 6 for the flue-gas which is conveyed to a chimney 9 or the like.

The hot flue-gas from the burner-nozzle 3 thus follows a path in the combustion chamber indicated by arrows on the Figures. If the rate of combustion is increased, the flue-gas rotates several times in the slot and thus yields more heat before passing through the opening 8 through the chimney 9. An expedient and well adapted passage of hot flue-gas is thus achieved and the means is adapted automatically to the separate heat requirements in accordance with the adjustment of the burner.

FIG. 4 illustrates a means according to the invention disposed in an air conditioning unit. The water heating means is located in the lower part 10 of the apparatus housing 11 with mounted end plate 12. The burner-nozzle 3 projects from the side and is supplied with oil from a pipe (not shown). In the upper part of the housing 11, the remaining members of the air conditioning unit are arranged, such heat battery, filters, dampers, fans etc. The conditioned air is passed to channels through an air distributor 13.

It may be mentioned that experiments with varying loads by measurements during operation have shown that the flue-gas temperature is approximately constant. This is extremely important in apparatus of this type and confirms at the same time the correctness of the theory which is the basis of the embodiment.

Having described my invention, I claim:

1. A water heater which comprises a combustion chamber having a cylindrical wall, an oil burner nozzle directed into the combustion chamber substantially parallel to an end thereof and oblique to the axis thereof, an annular heat exchange chamber at the opposite end of the combustion chamber having an outer cylindrical wall coextensive with the cylindrical wall of the combustion chamber and having an inner wall defining a hollow core chamber, and an external water reservoir surrounding both the combustion chamber and the annular heat exchange chamber; whereby hot flue gases generated from the oil burner nozzle flow in a continuous helical path along the wall of the combustion chamber and the walls of the annular heat exchange chamber.

2. The water heater as defined by claim 1 wherein the hollow core chamber is in communication with the external water reservoir and thereby forms an internal water reservoir.

3. The water heater as defined by claim 1 wherein the annular heat exchange chamber has a flue gas outlet connected thereto.

* * * * *